United States Patent
Toya et al.

(10) Patent No.: US 9,660,464 B2
(45) Date of Patent: May 23, 2017

(54) BATTERY PACK, ELECTRICAL HARDWARE, AND COMMUNICATION CONTROL METHOD

(71) Applicant: Panasonic Corporation, Osaka (JP)

(72) Inventors: Shoichi Toya, Hyogo (JP); Go Kuroda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 152 days.

(21) Appl. No.: 14/360,953

(22) PCT Filed: Jan. 15, 2014

(86) PCT No.: PCT/JP2014/000156
§ 371 (c)(1),
(2) Date: May 28, 2014

(87) PCT Pub. No.: WO2014/155904
PCT Pub. Date: Oct. 2, 2014

(65) Prior Publication Data
US 2015/0214758 A1 Jul. 30, 2015

(30) Foreign Application Priority Data
Mar. 29, 2013 (JP) .................. 2013-073908

(51) Int. Cl.
*H02J 7/00* (2006.01)
*H01M 2/10* (2006.01)
(Continued)

(52) U.S. Cl.
CPC ......... *H02J 7/0042* (2013.01); *H01M 2/1016* (2013.01); *H02J 7/007* (2013.01);
(Continued)

(58) Field of Classification Search
CPC ........ H02J 7/0042; H02J 7/007; H02J 7/0013; H02J 7/00; H02J 2007/0098;
(Continued)

(56) References Cited

U.S. PATENT DOCUMENTS 5,657,317 A * 8/1997 Mahany ............... G06F 1/1626
370/311
6,229,281 B1 5/2001 Tatsumi et al.
(Continued)

FOREIGN PATENT DOCUMENTS

CN 1457516 11/2003
CN 102455410 5/2012
(Continued)

OTHER PUBLICATIONS

International Search Report issued Mar. 4, 2014 in International (PCT) Application No. PCT/JP2014/000156.

Primary Examiner — Helen Rossoshek
(74) Attorney, Agent, or Firm — Wenderoth, Lind & Ponack, L.L.P.

(57) ABSTRACT

A battery pack has a communicator storing various communication protocols. When new hardware is connected thereto, the battery pack sequentially transmits a respective communication request signal to request communication with the hardware using a stored communication protocol, and establishes communication. The battery pack transmits the communication request signal using a standard such as a compatibility priority among communication protocols, a frequency priority for communication protocols used according to a history record, a communication speed priority for communication protocols, and so on, thereby achieving quick establishment of communication.

19 Claims, 9 Drawing Sheets

(51) Int. Cl.
  *H04L 29/08* (2006.01)
  *H04L 12/28* (2006.01)
  *H01M 10/42* (2006.01)

(52) U.S. Cl.
  CPC .......... *H02J 7/0013* (2013.01); *H02J 7/0027* (2013.01); *H02J 7/0054* (2013.01); *H04L 67/141* (2013.01); *H01M 2010/4278* (2013.01); *H02J 2007/0001* (2013.01); *H02J 2007/0098* (2013.01); *H04L 2012/2841* (2013.01)

(58) Field of Classification Search
  CPC ...... H02J 2007/0096; H02J 2007/0001; H04L 67/141; H01M 2/1016; H01M 2010/4278
  USPC .......................... 320/106, 107, 108, 118, 128
  See application file for complete search history.

(56) References Cited

U.S. PATENT DOCUMENTS

| | | | | |
|---|---|---|---|---|
| 7,068,675 | B1* | 6/2006 | Shitaya | H04L 1/22 370/439 |
| 7,667,429 | B2* | 2/2010 | Little | G06F 21/31 320/106 |
| 7,739,373 | B2* | 6/2010 | Ohnishi | G06F 13/385 709/204 |
| 8,185,101 | B1* | 5/2012 | Wiseman | G01S 5/0027 340/539.13 |
| 8,638,011 | B2* | 1/2014 | Robinson | G06F 1/263 307/115 |
| 8,670,799 | B2* | 3/2014 | Pattenden | G06F 1/26 320/106 |
| 8,736,228 | B1* | 5/2014 | Freed | H02J 7/025 320/107 |
| 8,820,626 | B2* | 9/2014 | Rich | H01M 10/48 235/375 |
| 2003/0138690 | A1 | 7/2003 | Matsui | |
| 2007/0052424 | A1 | 3/2007 | Okumura | |
| 2007/0123316 | A1* | 5/2007 | Little | G06F 21/31 455/573 |
| 2007/0214296 | A1 | 9/2007 | Takamatsu et al. | |
| 2007/0254596 | A1* | 11/2007 | Corson | H04W 40/244 455/68 |
| 2008/0252257 | A1* | 10/2008 | Sufrin-Disler | B60L 3/0046 320/118 |
| 2009/0015194 | A1* | 1/2009 | Cargin, Jr. | G06F 1/1613 320/106 |
| 2009/0058361 | A1* | 3/2009 | John | A61N 1/3785 320/128 |
| 2009/0212736 | A1* | 8/2009 | Baarman | H02J 7/0004 320/106 |
| 2011/0006603 | A1* | 1/2011 | Robinson | G06F 1/263 307/31 |
| 2011/0050164 | A1* | 3/2011 | Partovi | H01F 5/003 320/108 |
| 2011/0116556 | A1* | 5/2011 | Towers | H04W 52/0261 375/259 |
| 2012/0019674 | A1* | 1/2012 | Ohnishi | G08C 17/00 348/207.1 |
| 2012/0075664 | A1* | 3/2012 | Nichols | G06F 3/1204 358/1.15 |
| 2012/0091967 | A1 | 4/2012 | Kawamoto et al. | |
| 2012/0123227 | A1* | 5/2012 | Sun | A61B 5/14532 600/309 |
| 2012/0328094 | A1* | 12/2012 | Pattenden | G06F 1/26 380/28 |
| 2013/0247117 | A1* | 9/2013 | Yamada | G08C 17/02 725/93 |
| 2013/0288600 | A1* | 10/2013 | Kuusilinna | H02J 7/0004 455/41.2 |
| 2014/0009268 | A1* | 1/2014 | Oshima | G08C 17/02 340/12.5 |
| 2014/0035527 | A1* | 2/2014 | Hayashigawa | B60L 11/1818 320/109 |
| 2014/0097672 | A1 | 4/2014 | Takemura et al. | |
| 2014/0105397 | A1* | 4/2014 | Ikeda | H04B 5/02 380/270 |
| 2014/0249976 | A1* | 9/2014 | Sugimura | G06Q 50/06 705/34 |
| 2014/0273824 | A1* | 9/2014 | Fenner | H04B 5/0031 455/41.1 |
| 2014/0351832 | A1* | 11/2014 | Cho | H04L 67/141 719/328 |
| 2014/0368601 | A1* | 12/2014 | deCharms | H04W 4/021 348/14.02 |
| 2015/0028692 | A1* | 1/2015 | Makhota | H01L 31/02021 307/115 |
| 2015/0224890 | A1* | 8/2015 | Kim | H04L 12/40006 320/109 |

FOREIGN PATENT DOCUMENTS

| | | |
|---|---|---|
| CN | 102709989 | 10/2012 |
| CN | 202712883 | 1/2013 |
| JP | 2002-042897 | 2/2002 |
| JP | 2007-071632 | 3/2007 |
| JP | 2007-282471 | 10/2007 |
| JP | 2012-085493 | 4/2012 |
| JP | 2012-250552 | 12/2012 |
| WO | 99/00721 | 1/1999 |

* cited by examiner of a battery pack.

BATTERY PACK, ELECTRICAL HARDWARE, AND COMMUNICATION CONTROL METHOD

TECHNICAL FIELD

The present disclosure pertains to a battery pack.

BACKGROUND ART

A battery pack is, for example, used as a drive power source for a motor in hardware such as a power-assisted bicycle.

Patent Literature 1 discloses an example of such a power-assisted bicycle.

CITATION LIST

Patent Literature

[Patent Literature 1]
Japanese Patent Application Publication No. 2012-250552

SUMMARY OF INVENTION

This sort of battery pack is normally designed to be used exclusively with a specific type of electric equipment, given safety and operational considerations. As such, a problem arises in that, for example, a battery pack for a power-assisted bicycle cannot be used in an emergency, for lighting, electric stoves, heaters, and so on, despite having available electric power.

Also, hardware using a battery pack performs an exchange of information with the battery pack regarding remaining available power and the like. However, the communication protocol used to this ultimately varies for each type of hardware. Therefore, there is a problem in that the battery pack cannot communicate with hardware not intended for use with that battery pack, and that the remaining available power cannot be known without using the battery pack.

In consideration of the above-described problem, the present disclosure aims to provide a battery pack that is usable with many different types of hardware.

In order to resolve the problem, the present disclosure provides a battery pack used by removably connecting to a plurality of external hardware types each having a different communication protocol, the battery pack comprising: a secondary cell; a connector removably connecting the battery pack to external hardware; a memory storing a plurality of communication protocols; a power discharge circuit performing discharge from the secondary cell to the external hardware; an establisher establishing communication by specifying a usable communication protocol, among the communication protocols, that communicates with the external hardware; and a controller causing the power discharge circuit to discharge electric power for driving the external hardware when the establisher has established communication with the external hardware.

According to the above, the battery pack is able to connect to various types of hardware using different communication protocols, and to supply electric power thereto.

DETAILED DESCRIPTION OF INVENTION

<Discovery by Inventors>

Various battery packs are currently being developed. These battery packs are normally designed for exclusive use with hardware employing that battery pack. This is because each type of hardware requires specific values of power, voltage, current, and so on. The required precision (e.g., decimal places of accuracy required for the voltage) also varies. Therefore, designs that are exclusive to specific hardware are not only safer but also able to decrease danger of short circuiting and the like. Therefore, development of battery packs normally begins with determination of the application and usage of the battery pack.

The usage of battery packs is expected to increase in the near future. These include applications to electric automobiles, power-assisted bicycles, personal computers, refrigerators, and so on. Also, battery packs are considered extremely effective in emergencies and the like, such that the inventors expect demand for battery packs to increase.

However, the inventors have also noticed that, as usage of the aforementioned battery packs spreads throughout society, supply cannot keep up with demand through the development of hardware-specific battery packs, and that development costs on the supply side and purchasing costs of specific battery packs on the demand side cause greater expenses for both sides. As such, the inventors realised that for the demand side, battery packs lack the ability to function with other types of hardware.

Therefore, the inventors approached development of the present disclosure from the need for a battery pack that can be used commonly for many types of hardware while remaining similar to standard battery packs.

However, electric hardware performs communication with outside hardware or internal components through a communication method (also termed a communication protocol) determined for that type of hardware. Thus, the inventors noticed the problem that a battery pack cannot be used with all types of hardware by simply providing a terminal for connecting the battery pack to the hardware.

The inventors have arrived at a battery pack that is highly generalizable to usage in connection with various types of hardware, maintains a standard of safety, is compatible with many communication protocols, and performs discharge only when communication has been established.

The details of the battery pack pertaining to the disclosure are described below.

<Embodiment>
<Configuration>

Figure 1:
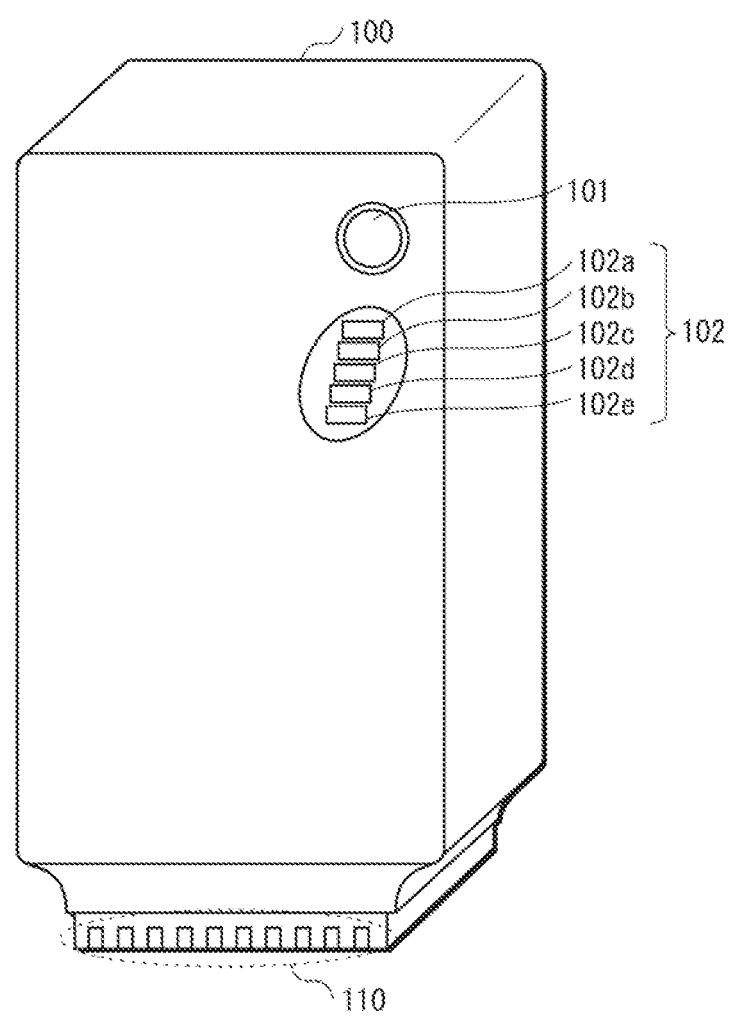
FIG. 1 is a perspective view diagram of the battery pack.

FIG. 1 is a perspective view diagram of a battery pack 100 pertaining to Embodiment 1. As shown, the battery pack 100 includes a switch 101 for starting and stopping the battery pack, a display 102 for making notifications to a user regarding remaining available power and error messages, and terminals 110 for supplying and receiving electric power. The terminals 110 include a communication terminal used for communicating with connected hardware, a charging terminal for charging electricity, and so on.

Figure 2:
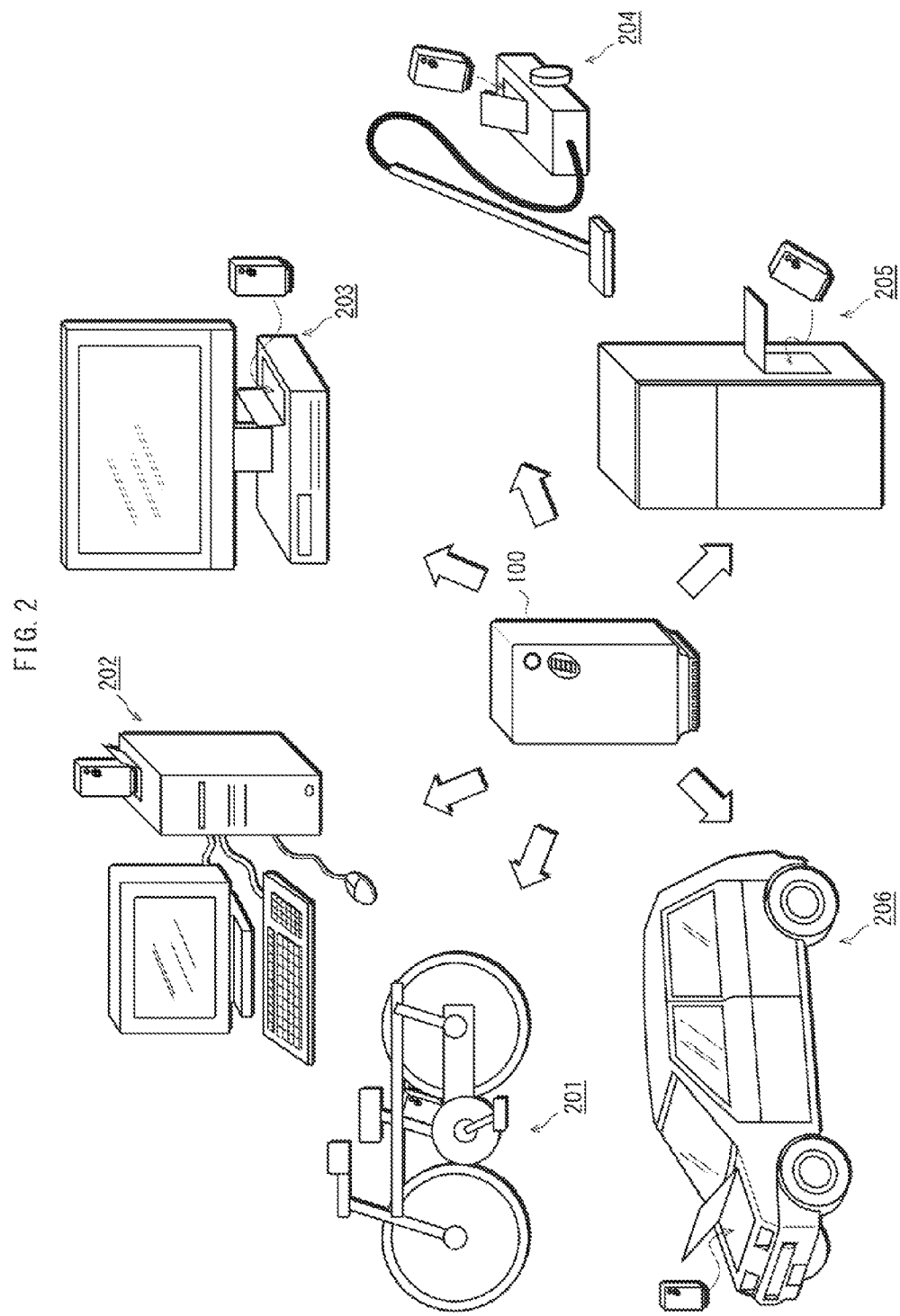
FIG. 2 illustrates usage examples of the battery pack.

FIG. 2 illustrates usage examples of the battery pack 100.

As shown, the battery pack 100 is, for example, used by connecting to an electric bicycle 201, as an uninterruptible power supply for a PC 202, by connecting to a BD playback device 203, by connecting to a vacuum cleaner 204, by connecting to a refrigerator 205, by connecting to an electric automobile 206, and so on. The generality of the battery pack 100 is increased by adaptation to these various devices. For example, when the power distribution grid is down due to an emergency such as a natural disaster, the user of the battery pack 100 is still able to employ the battery pack 100.

The terminals for using the battery pack must be provided to the hardware in order to function. The battery pack 100 is configured for compatibility without requiring a change in the configuration of the hardware to communicate with the battery pack 100.

The various types of electronic hardware presented as examples in FIG. 2 each have a connection terminal for connecting to the battery pack 100. The electric hardware is able to perform communication via such a connection terminal and to receive electric power from the battery pack 100 to execute specific functions. The hardware depicted in FIG. 2 form a set of examples, and other hardware may also be used provided that drive circuits receiving electric power and the like are present.

Figure 3:
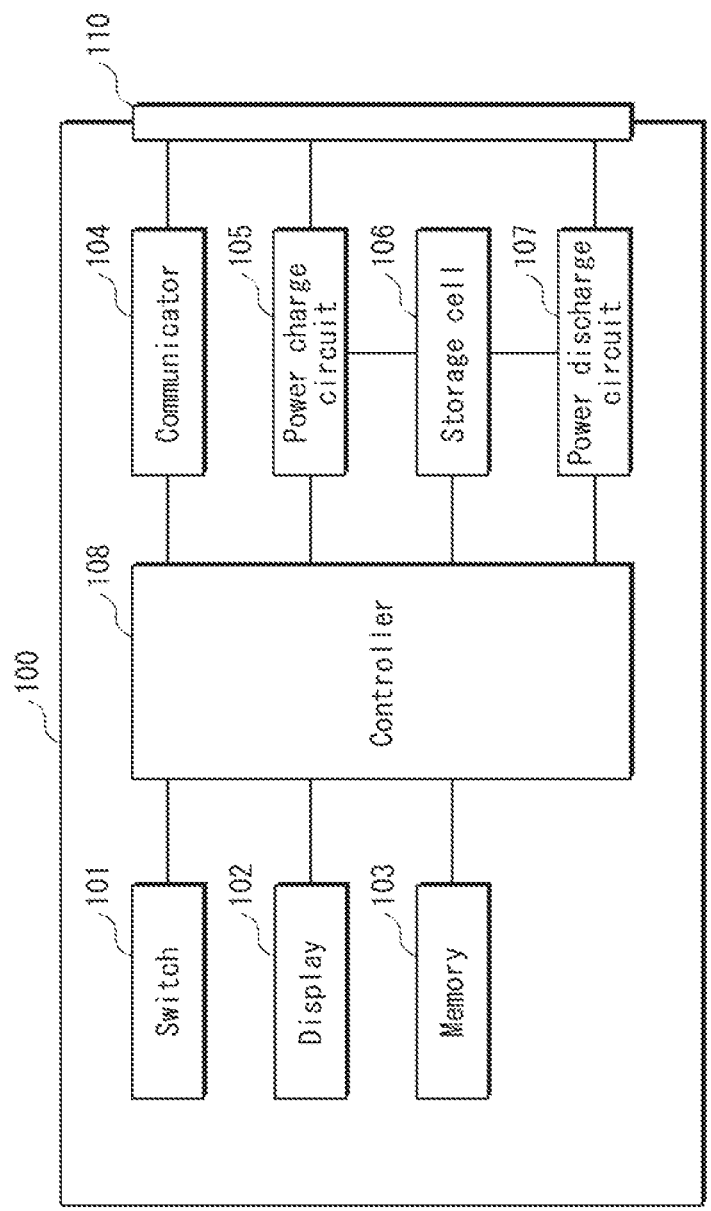
FIG. 3 is a functional block diagram illustrating the configuration of the battery pack.

FIG. 3 is a functional block diagram illustrating the configuration of the battery pack 100. As shown, the battery pack 100 includes the switch 101, the display 102, a memory 103, a communicator 104, a power charge circuit 105, a storage cell 106, a power discharge circuit 107, a controller 108, and the terminals 110.

The switch 101 receives input from a user for starting and stopping the battery pack 100. When inactive, a push by the user causes the battery pack 100 to start, and when active, a push by the user causes the battery pack 100 to stop.

The display 102 is a set of indicators displaying the remaining battery life of the storage cell 106 in accordance with an instruction from the controller 108. As shown in FIG. 1, the display 102 includes a set of indicators 102a through 102e. Each of the indicators corresponds to a single LED lamp. The display 102 lights and extinguishes the LED lamps to display the remaining battery life and the state of the battery pack. The display 102 notifies the user of the state of the battery pack 100 in accordance with instructions from the controller 108, for instance with a pattern of illumination on the display 102 indicating an error or the like.

Specifically, the display 102 illuminates indicator 102e alone when the remaining battery life of the storage cell 106 is under 20%, illuminates indicators 102d and 102e when the remaining battery life of the storage cell is 20% or more and less than 40% illuminates indicators 102c, 102d, and 102e when the remaining battery life of the storage cell is 40% or more and less than 60%, illuminates all indicators other than 102a when the remaining battery life of the storage cell is 60% or more and less than 80%, and illuminates all of the indicators when the remaining battery life of the storage cell 106 is 80% or more. Also, the display 102 lights up in response to an error. For example, when some malfunction affecting the state of health (hereinafter, SOH) occurs, the display 102 lights indicators 102a, 102c, and 102e.

The memory 103 stores programs and data needed for operation of the battery pack 100. The memory 103 stores communication protocol information 400 indicating communication protocols compatible with the battery pack 100, protocol group information 500 grouping compatibly similar communication protocols to define communication protocol groups, history information indicating a communication history, and communication speed information 700 indicating a communication speed for each protocol. The details of this information are provided later.

The communicator 104 communicates with the hardware connected to the battery pack 100 via the terminals 110.

Specifically, the communicator 104 first acknowledges a change in power phase at the terminals 110, which indicates new hardware connected to the battery pack 100 via the terminals 110. Once a new hardware connection has been acknowledged, the communicator 104 makes a notification to such effect to the controller 108. The communicator 104 then transmits a communication request signal using communication protocols in an order indicated by the controller 108.

The communicator 104 waits for a predetermined wait period after transmitting the communication request signal for one of the communication protocols. When a response signal is received from the connected hardware during the wait period, the communicator 104 attempts to establish a connection as defined by the communication protocol used to transmit the communication request signal. The process of establishing communication lasts from the transmission of the communication request signal until the connection is established according to the communication protocol. When there is a failure to establish communication, and when no response signal is received in the predetermined wait period, the communicator 104 transmits a communication request signal using a different communication protocol. When communication is established using any one of the communication protocols, the communicator 104 makes a notification to the controller 108 of the communication protocol name. Also, when there is a failure to establish communication with all of the communication protocols, the communicator 104 makes a communication failure notification to the controller 108.

Also, the communicator 104 detects removal of connected hardware by detecting a change in electric phase of the terminals 110 and makes a notification to such effect to the controller 108.

Although simplified in the description, the communication protocols differ in terms of communication process. Some communication protocols establish communication by receiving an immediate response signal in reply to the communication request signal from the battery pack 100, and other communication protocols establish communication by using the communication request signal as a trigger for performing several exchanges with the hardware connected to the battery pack 100. Here, establishing communication signifies reaching a state of transmitting and receiving actual data to and from the hardware connected to the battery pack 100 without problem, according to a process defined to the communication protocol. Also, the actual data being transmitted and received represents data from the battery pack required to be stored by the connected hardware, and to data from the connected hardware required to be stored by the battery pack. For example, this includes remaining battery life of the battery pack, data for power requests by the hardware, and so on.

The power charge circuit 105 charges power to the storage cell 106 using a charge voltage and charge current, when indicated by the controller 108. Specifically, the power charge circuit 105 includes an AC/DC inverter. The power charge circuit 105 converts alternating current power supplied thereto (e.g., commercial power) via the terminals 110 into direct current power and charges the storage cell 106 when instructed by the controller 108. As such, the power charge circuit 105 receives alternating current supplied from the terminals 110 and converts it into the direct current power to charge the storage cell 106.

The storage cell 106 is a secondary cell, such as a lithium-ion cell, discharged by the power discharge circuit 107 and charged by the power charge circuit 105.

Figure 9:
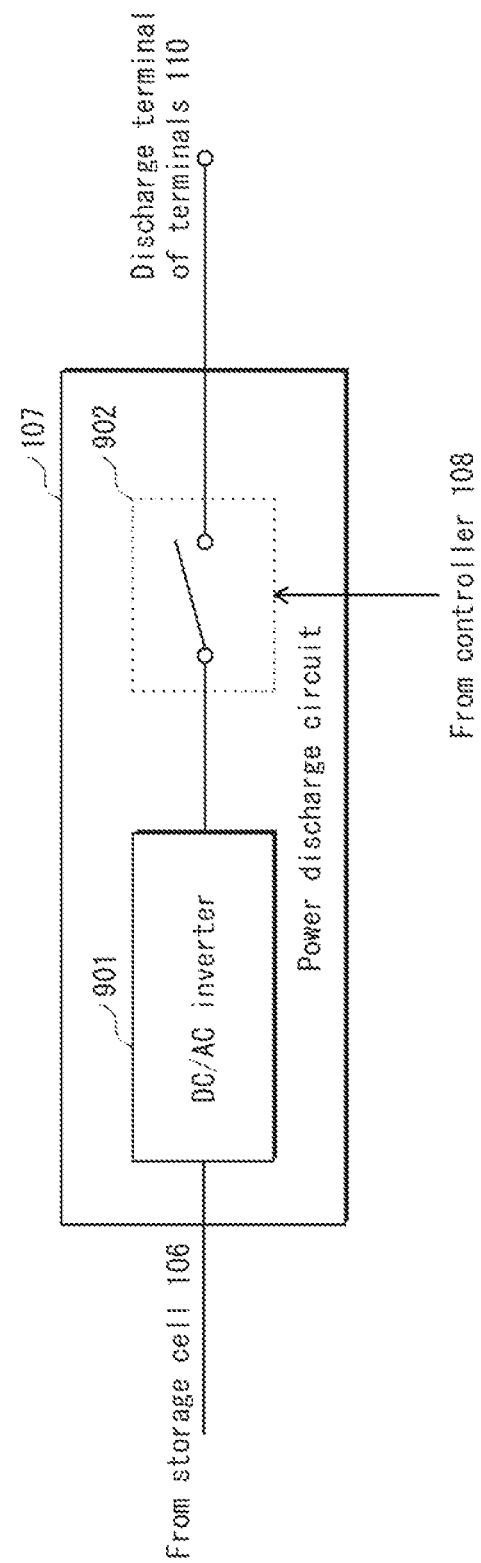
FIG. 9 is a circuit diagram illustrating an example of a power discharge circuit.

The power discharge circuit 107 causes a discharge from the storage cell 106 as instructed by the controller 108, which indicates the timing, a discharge voltage, and a discharge current. FIG. 9 shows an example of a power discharge circuit 107. As shown, the power discharge circuit 107 includes a DC/AC inverter 901 and a switch 902, connected in series to the storage cell 106 and to the terminals 110. The DC/AC inverter 901 converts direct current power supplied from the storage cell 106 into alternating current power at a discharge voltage value and discharge current value indicated by the controller 108. The switch 902 of the power discharge circuit 107 is made conductive when instructed by the controller 108, and outputs the alternating current power from the DC/AC inverter 901 to the connected hardware via the terminals 110. The switch 902 is never made conductive without the communicator 104 establishing communication with the hardware connected to the battery pack 100. Although not shown in FIG. 9, the discharge terminal actually includes a positive terminal and a negative terminal for discharge, and each of these terminals is connected to the DC/AC inverter 901 by separate wiring.

The controller 108 controls each part of the battery pack 100.

When the switch 101 receives a notification of button pressing while the battery pack 100 is inactive, the controller 108 activates the components of the battery pack 100. Similarly, when the switch 101 receives a notification of button pressing while the battery pack 100 is active, the controller 108 stops the components of the battery pack 100.

The controller 108 successively detects the remaining battery life of the storage cell 106 and illuminates the LED lamps of the display 102 to indicate various states, in accordance with the remaining battery life or with a detected error.

Upon receiving a notification of newly-connected hardware from the communicator 104, the controller 108 obtains a setting value for a selection method (also termed a determination method for a communication request signal transmission process) to select a communication protocol for attempting to establish communication with the connected hardware. The setting value is information for defining a setting order of the communication protocols. The precise content of the setting order may be a group priority, a frequency priority, a history priority, a speed priority, no setting, and so on. For example, the setting value may be managed as a 4-bit value, such that 0000 indicates no setting, 0001 indicates group priority, 0010 indicates frequency priority, and so on. The setting value is set in advance, by a PC or the like connected to the terminals 110 or by a press of the switch 101. The method of setting the transfer procedure by pressing the switch 101 is described below. When there is a long press of the switch 101, the controller 108 lights one or more of the indicators 102a through 102e. The user releases the switch 101 in time with a lighting method corresponding to a setting value defining the communication request signal transfer procedure to select that setting value as the transfer procedure. For example, releasing the switch 101 when indicators 102a and 102e are illuminated signifies the speed priority, such that the communication request signal transmission procedure is used in order of communication protocol communication speed.

When no setting value has been set for the communication request signal transmission process, the controller 108 transmits, to the communicator 104, the communication request signal for all communication protocols stored in the memory 103 in a predetermined order.

The setting value pertaining to the communication request signal transmission order is one of a group priority for prioritising transmission of a communication request signal from a representative protocol belonging into a communication protocol group, a recency priority for prioritising transmission of a communication request signal in a communication protocol having been most recently used when new hardware is connected, a frequency priority for prioritising transmission of a communication protocol used frequently, and a speed priority for prioritising transmission of a high-speed communication protocol.

When the setting value is the group priority, the controller 108 references the protocol group information 500 stored in the memory 103 and transmits the communication request signal for the representative protocol of each group to the communicator 104. Also, when a certain level of the conditions is satisfied without establishing communication using the representative communication protocol, the controller 108 sequentially transmits, to the communicator 104, the communication request signal of each member communication protocol in the group to which the representative communication protocol belongs. The predetermined conditions are a set of conditions for establishing communication. For example, in the TCP/IP communication protocol establishing communication involves four layers, namely a network access layer, a network layer, a transport layer, and an application layer. However, the certain level of conditions may be satisfied simply by establishing communication as far as the transport layer. Alternatively, capability information may be acquired from the hardware connected to the battery pack 100, and the predetermined conditions may be satisfied by confirming that hardware requirements required for executing the communication protocol are available.

When the setting value is the recency priority, the controller 108 references the history information 600 and sequentially transmits, to the communicator 104, a communication request signal of the communication protocols most recently used to establish a connection. When the most recently used communication protocol has failed to establish a connection, the communication request signal of the remaining communication protocols are used in a predetermined order.

When the setting value is the frequency priority, the controller 108 references the history information 600, specifies a communication protocol having a high usage frequency, and prioritises transmission, to the communicator 104, of the communication request signal of that high-usage frequency communication protocol.

When the setting value is the speed priority, the controller 108 references the communication speed information 700, specifies a high-speed communication protocol, and prioritises transmission, to the communicator 104, of a communication request signal from a high-speed communication protocol. High communication speed signifies that the actual communication speed of the communication protocol is high. Also, when the most recently used communication protocol has failed to establish communication, the communication request signals of each communication protocol that has previously established communication are transmitted in order.

Once communication is established, the controller 108 adds the name of the communication protocol received from the communicator 104 as well as the date of communication to the history information 600. The controller 108 proceeds to execute charge and discharge control only upon receiving a notification of established communication from the communicator 104.

The controller 108 makes charge and discharge instructions to the power charge circuit 105 and the power discharge circuit 107. These instructions may be executed upon indication by the user of the battery pack 100 or may be executed according to a predetermined schedule. The details of charge and discharge control are omitted.

The terminals 110 receive and supply electric power when the battery pack 100 is connected to electric hardware or to a frame device equipped with a terminal corresponding to the terminals 110. The terminals 110 include a communication terminal used to communicate with connected hardware or to detect a connection to hardware, a charge terminal for charging electricity, a discharge terminal for discharging electricity, a ground terminal for connecting to the ground, and so on. The charge terminal and the discharge terminal may also be combined into a common terminal.

<Data>

Figure 4:
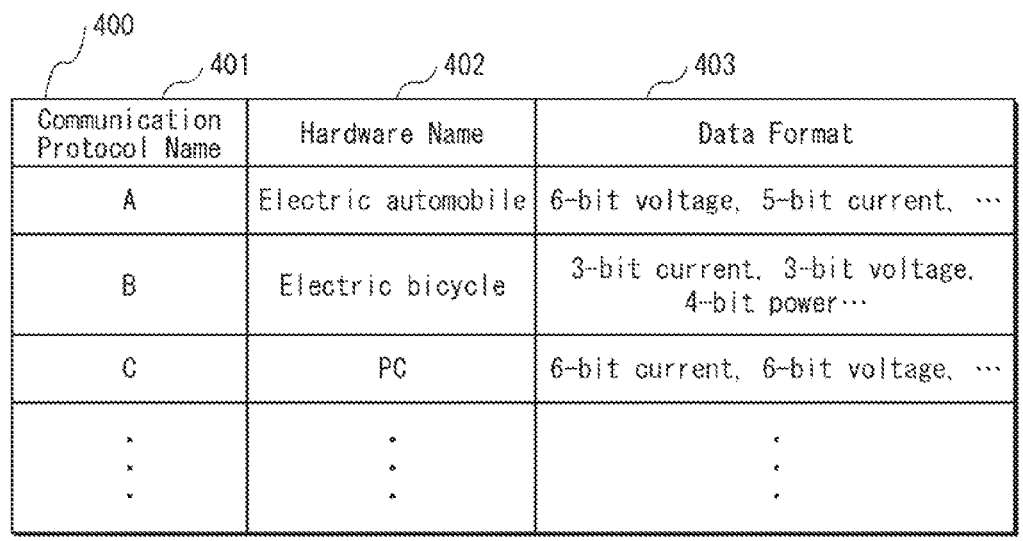
FIG. 4 illustrates communication protocol information.

FIG. 4 is a schematic diagram illustrating a sample data configuration of the communication protocol information 400 listing a communication protocol capable of communicating with the battery pack and sample data executing the actual exchange with the hardware.

The communication protocol information 400 includes a communication protocol name 401, a hardware name 402, and a data format 403, stored in association. In this example, the communication protocol name is given as A, B, or the like, for the sake of convenience in the present description. In practice, the communication protocol may be CAN when used with an electric automobile, or may be UART when used with a power-assisted bicycle, for instance.

The communication protocol name 401 is an identifier used by the battery pack 100 to identify each of the communication protocols.

The hardware name 402 is an identifier used by the battery pack 100 to identify the electronic hardware using the communication protocol indicated by the communication protocol name 401.

The data format 403 defines a format and data used for exchanges when performing actual communications with the hardware indicated by the hardware name 402.

In FIG. 4, for example, the hardware using communication protocol A has the name "Electric automobile" and the data transmitted and received for actual communications reads "6-bit voltage, 5-bit current".

The battery pack 100 stores the communication protocol information 400 and executes transmission and reception of needed data according to the various communication protocols.

Figure 5:
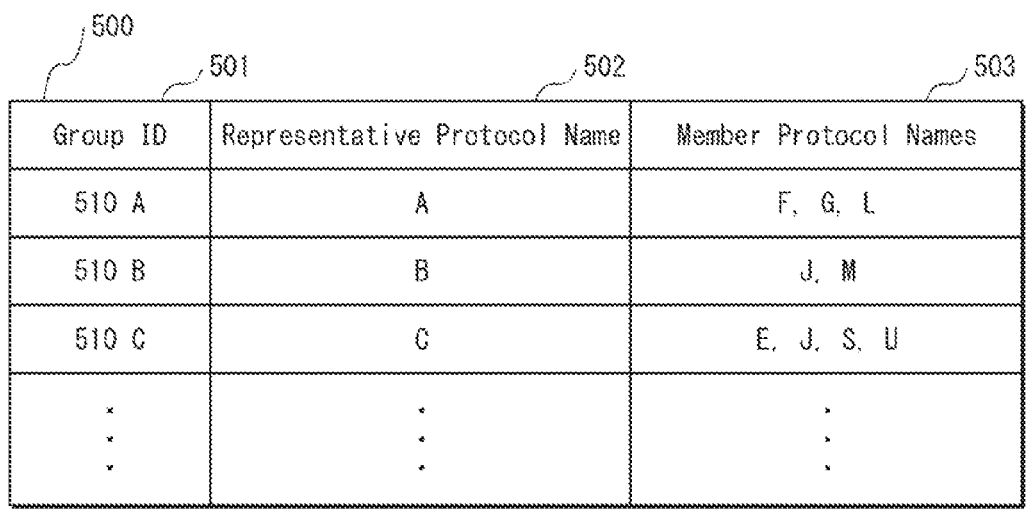
FIG. 5 illustrates protocol group information.

FIG. 5 is a schematic diagram illustrating a sample data configuration of the protocol group information 500.

As shown, protocol group information 500 includes a group ID 501, a representative protocol name 502, and a list of member protocol names 503, stored in association.

The group ID 501 is an identifier used by the battery pack 100 to identify a group of communication protocols identified as being compatible.

The representative protocol name 502 identifies one communication protocol within the group identified by the group ID 501 for prioritising transmission of a communication request signal by the communicator 104 to establish communication.

The member protocol names 503 are a list of all communication protocols other than representative protocol 502, that are members of the group identified by the group ID 501.

In FIG. 5, for example, the group having the group ID 510A includes communication protocols A, F, G, and L, among which protocol A is the representative protocol.

The battery pack 100 storing the protocol group information 500 is able to realise quick establishment of communication by transmitting a communication request signal of the representative protocol from the group of communication protocols identified as compatible and finding whether or not communication is possible.

Figure 6:
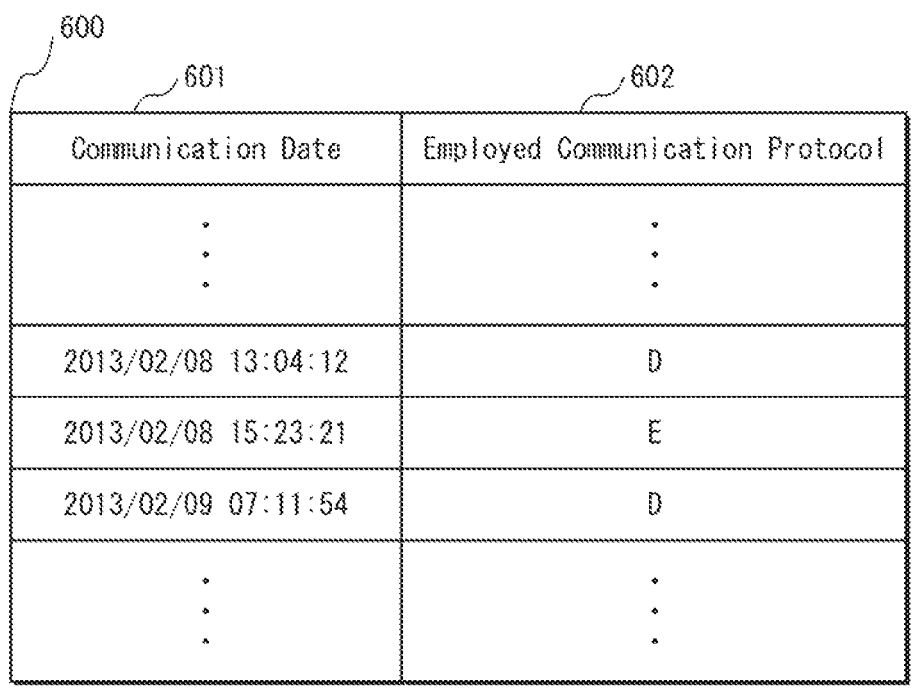
FIG. 6 illustrates history information.

FIG. 6 is a schematic diagram illustrating a sample data configuration of the history information 600, which indicates the history of communication protocols actually used for communication between the battery pack and the hardware.

The history information 600 includes a communication date 601 and an employed communication protocol 602.

The communication date 601 indicates the time at which communication has been performed.

The employed communication protocol 602 indicates the communication protocol actually used for performing communication.

According to FIG. 6, for example, the battery pack 100 has used communication protocol D to perform communication at 13:04:12 on Feb. 8, 2013.

The battery pack 100 storing the history information 600 is able to specify a communication protocol used most recently, or a communication protocol having a high usage frequency. Also, an order of communication protocols used for establishing communication can be specified. Specifying these communication protocols enables quick establishment of communication by prioritising the transmission of a corresponding communication request signal.

Figure 7:
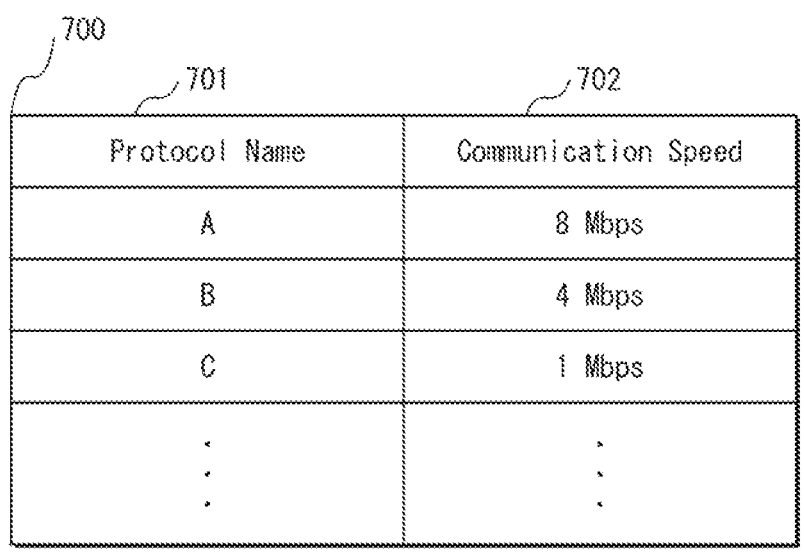
FIG. 7 illustrates speed information for each communication protocol.

FIG. 7 is a schematic diagram illustrating a sample data configuration of the communication speed information 700.

As shown, the communication speed information 700 includes a communication protocol name 701 and a communication speed 702, stored in association.

The communication protocol name 701 identifies a communication protocol used for communication, much like the communication protocol name 401 in the communication protocol information 400 of FIG. 4.

The communication speed 702 indicates the actual communication speed (i.e., the effective transfer rate) achieved with the communication protocol indicated by the communication protocol name 701.

The battery pack 100 storing the communication speed information 700 is able to achieve quick establishment of communication by prioritising transmission of a communication request signal needing only a short time to establish communication.

<Operations>

Figure 8:
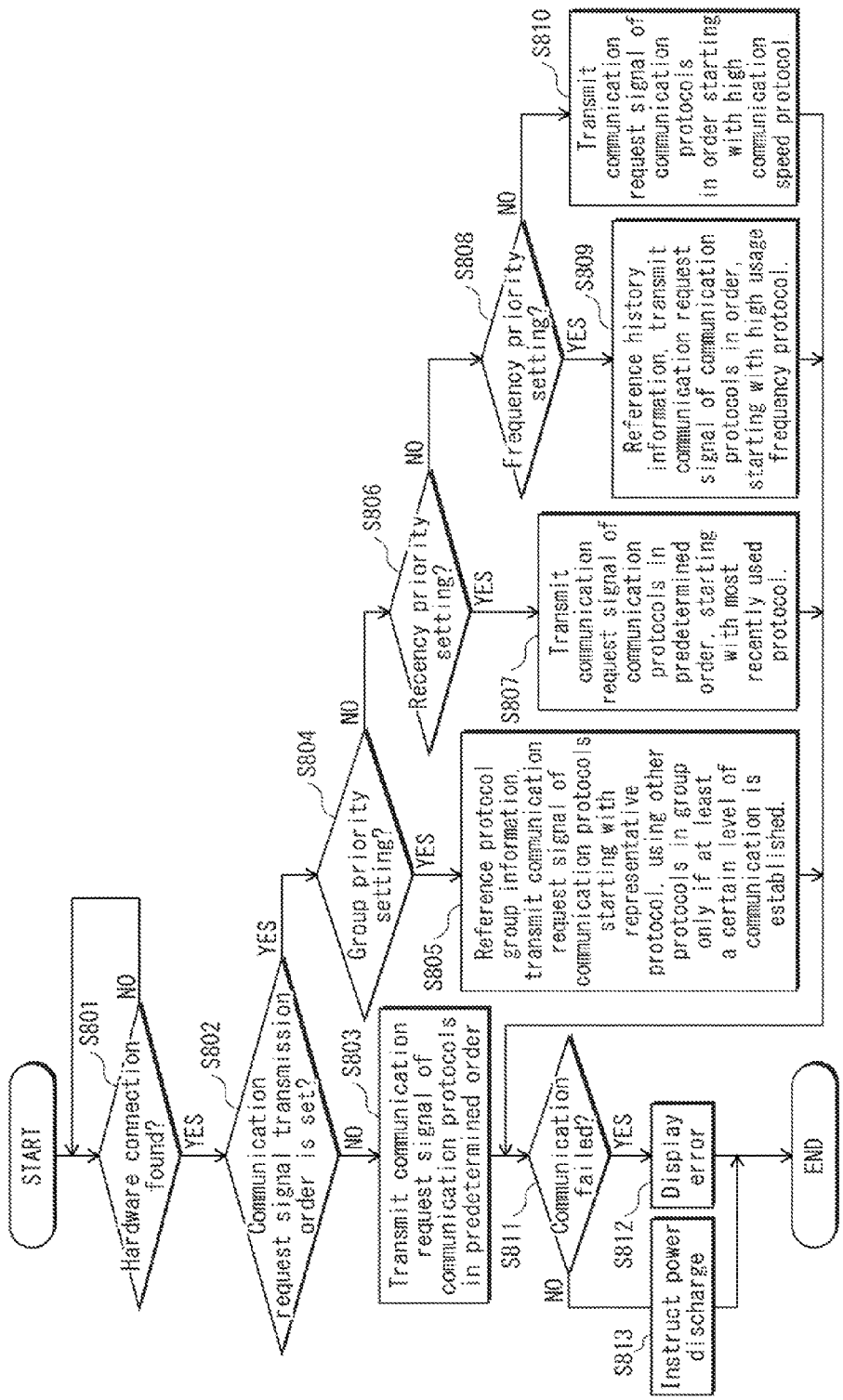
FIG. 8 is a flowchart of operations by the battery pack.

FIG. 8 is a flowchart of battery pack 100 operations indicating all operations from the connection of the battery pack 100 and hardware to the establishment of communication.

The communicator 104 of the battery pack 100 regularly checks whether hardware is connected (step S801). The battery pack 100 waits for a hardware connection to be detected (NO in step S801).

Once the communicator 104 detects a change in power phase of the terminals 110 and confirms that hardware is connected (YES in step S801), the communicator 104 makes a notification of hardware connection to the controller 108.

Upon receiving the notification of hardware connection from the communicator 104, the controller 108 checks a register storing a setting value that defines a communication request signal transmission order, and checks whether or not the setting value is present (step S802).

When the setting value that defines a transmission order is not present (NO in step S802), the controller 108 causes the communicator 104 to transmit the communication request signal of each communication protocol in a predetermined order (step S803). The communicator 104 attempts to establish communication with the connected hardware in accordance with each of the communication protocols, in the designated order.

When the setting value defining the transmission order indicates the group priority (YES in step S804), the controller 108 reads the protocol group information 500 from the memory 103. The controller 108 then causes the communicator 104 to prioritise transmitting the communication request signal of the communication protocols indicated by the representative protocol name 502 in the protocol group information 500. When the communicator 104 is unable to establish communication using one of the representative protocols but one or more conditions is found to be satisfied, the controller 108 is notified of that representative protocol. The controller 108 then interrupts transmission of the communication request signal for that representative protocol. Upon receiving such notification, the controller 108 causes the communicator 104 to transmit, in order, the communication request signal of other communication protocols belonging to the same group as the representative protocol in the notification. When no response signal is received from the connected hardware in response to the communication request signal of the other communication protocols in the group, the communicator 104 restarts the interrupted transmission of the communication request signal for the representative protocol (step S805).

When the setting value defining the transmission order indicates the recency priority (YES in step S806), the controller 108 reads the history information 600 from the memory 103. The controller 108 then causes the communicator 104 to transmit the communication request signal of the communication protocol used most recently (i.e., having the newest communication date) according to the history information 600, and then to transmit the communication request signal of other communication protocol in a predetermined order. The other communication protocols may also be ordered according to communication date recency. The communicator 104 attempts to establish communication with the connected hardware by transmitting the communication request signal, in order of notification by the controller 108 (step S807).

When the setting value defining the transmission order indicates the frequency priority (YES in step S808), the controller 108 reads the history information 600 from the memory 103. The controller 108 then identifies communications performed within a predetermined period of the present (e.g., one month) using the communication date in the history information 600, and counts the number of times each communication protocol has been used. The controller 108 then causes the communicator 104 to transmit the communication request signal of the communication protocol having the highest count. The controller 108 also causes the communicator 104 to transmit the communication request signal of communication protocols not stored in the history information 600, in a predetermined order. The communicator 104 attempts to establish communication with the connected hardware by transmitting the communication request signal, in order of notification by the controller 108 (step S809).

When the setting value defining the transmission order indicates the speed priority (NO in step S808), the controller 108 reads the communication speed information 700 from the memory 103. The controller 108 then identifies a communication protocol having a high communication speed according to the communication speed information 700 and causes the communicator 104 to transmit the communication request signal for the protocol identified as having the highest communication speed. The communicator 104 attempts to establish communication with the connected hardware by transmitting the communication request signal, in order of notification by the controller 108 (step S810).

When communication has been established by transmitting the communication request signal in any transmission order (NO in step S811), the communicator 104 makes a notification to the controller 108 regarding the communication protocol that established communication. The controller 108 then updates the history information 600 by associating the current time with the protocol in the notification. Next, the controller 108 permits the power discharge circuit 107 to discharge electricity. As described above, the power discharge circuit 107 discharges electricity according to timing indicated by the controller 108.

When the communication request signal for all communication protocols has been transmitted without communication being successfully established with any communication protocol (YES in step S811), the communicator 104 makes a notification of communication failure to the controller 108. Upon receiving the notification of communication failure, the controller 108 illuminates an indicator of the display 102 signifying communication failure and ends processing. When the communicator 104 has failed to establish communication with the connected hardware, the switch of the power discharge circuit 107 is not made conductive, and as such, no discharge of electricity occurs.

This concludes the operations of the battery pack 100 in establishing communication with connected hardware.

<Variations>

The battery pack pertaining to the present disclosure has been described above in accordance with the Embodiment. However, no particular limitation is intended. The following variations are included in the disclosure.

(1) In the above-described Embodiment, electricity is discharged to the connected hardware only after the battery pack 100 has specified the communication protocol for the connected hardware. However, this is not intended as a limitation on electricity discharge. When the battery pack 100 is connected to a charger or similar hardware or terminal capable of supplying electric power to the battery pack 100, electricity may be charged after specifying the communication protocol.

In such circumstances, the battery pack 100 communicates with the connected hardware to determine whether or not electric power can be supplied. When a circuit capable of supplying electricity is found, the power charge circuit 105 is instructed to charge the storage cell 106, rather than instructing the power discharge circuit 107 to discharge electricity.

(2) In the above-described Embodiment, the battery pack 100 is able to select a control method for determining which communication protocol should be used to transmit a communication request signal, and also to select a transmission order for a plurality of communication request signals. However, no such limitation is intended. The battery pack 100 may instead use only or a subset of the communication request signal transmission orders described in the above Embodiment.
(3) The communication request signal transmission orders described in the above Embodiment may be freely combined.

For example, the recency priority may be combined with the frequency priority to prioritise transmitting the communication request signal of a communication protocol that has been most recently used, followed by high usage frequency communication protocols.
(4) The communication speed information 700 of the above-described Embodiment indicates a communication speed that is the actual communication speed of the communication protocol. However, no such limitation is intended. Instead of the speed, the communication speed 702 in the communication speed information 700 may indicate an average time needed to establish communication with various types of connected hardware using that communication protocol, or may indicate wait time for the response signal to the communication request signal until a timeout process is performed. Defining the communication speed 702 in this matter enables the controller 108 to determine the fastest communication speed by finding the shortest time.
(5) In the above-described Embodiment, step S809 involves specifying a communication protocol having a high usage frequency with respect to actual use within a predetermined period from the present. However, no imitation to a predetermined period is intended. The protocol may be specified from a communication log of all activity, stored in the history information 600.
(6) In the above-described Embodiment, the battery pack 100 switches among communication protocols to transmit the communication request signal to the connected hardware and identify a communication protocol that is able to communicate. However, no such limitation is intended. A protocol may also be specified by communication from the hardware rather than by communication from the battery pack 100.

That is, the electric hardware may transmit a communication request signal of a usable communication protocol to the battery pack 100 upon detecting connection to the connection terminal. In such circumstances, the battery pack 100 checks the format of the received communication request signal, specifies the usable communication protocol, and uses the specified communication protocol to realise communication with the connected electric hardware.
(7) In the above-described Embodiment, the communicator 104 detects the connected hardware. However, no such limitation is intended to the detection method, provided that connection of hardware to the battery pack 100 is detectable. For example, the battery pack 100 may acknowledge a new hardware connection when the switch 101 of the battery pack 100 is pressed for at least a predetermined interval and then released by the user.
(8) Although not illustrated, in the above-described Embodiment, the battery pack 100 may be provided with a plug for connecting to an outlet that is part of a power distribution grid, or be provided with an outlet for connecting a plug of the electric hardware, in addition to the terminals 110.

When the plug is connected to an outlet, the communicator 104 may detect a change in power phase caused by the connection of the plug to the outlet instead of detecting a hardware connection.
(9) In the above-described Embodiment, the memory 103 stores a plurality of communication protocols in advance, in accordance with the communication protocol information 400. However, the communication protocols may also be added later. That is, the communicator 104 may connect to an external network to receive a new communication protocol and add the new communication protocol to the communication protocol information 400. Also, the terminals 110 may be connected to a particular type of hardware for the communicator 104 to receive a new communication protocol and add that new communication protocol to the communication protocol information 400. The communication protocol information stored in the memory 103 may also be updated.

Accordingly, the battery pack is able to store new communication protocols when appropriate, which increases the compatible electric hardware for connection.
(10) In the above-described Embodiment, no discharge occurs when the communication request signal has been transmitted for all communication protocols and communication has not been established with any of the communication protocols. However, the battery pack 100 may also prevent discharge from occurring when a discharge forbidden signal is received from the connected hardware.
(11) In the above-described Embodiment, the battery pack 100 is started and stopped by pressing the switch 101. However, the battery pack 100 may also be started when acknowledging the connection to the hardware via the terminals 110, with no press of the switch 101. Also, the battery pack 100 may be stopped upon acknowledging that the hardware has been removed from the terminals 110, with no press of the switch 101.
(12) The components of the battery pack described in the above Embodiment may be realised as circuits realising the functions thereof, or as a program executed by one or more processors. The battery pack of the above-described Embodiment may also be an integrated circuit package such as an integrated circuit (hereinafter, IC) or large scale integration (hereinafter, LSI). Such a package is supplied as embedded into various devices such that the devices can realise the functions described in the Embodiment.

The functional blocks are typically realised as an LSI integrated circuit. These may be realised individually as separate chips, or else a subset of or all of the components may be realised as a single chip. The integrated circuit method is not limited to LSI but may also be IC, system LSI, super LSI, or ultra LSI, according to the degree of integration. Also, the integration method is not limited to LSI. A dedicated circuit or general-purpose processor may also be used. After LSI manufacture, a Field Programmable Gate Array (hereinafter, FPGA) or a reconfigurable processor may be used.
(13) The operations pertaining to transmission and to the communication request signal transmission process (see FIG. 8) of the above-described Embodiment may be written into a control program made up of program codes for execution by a processor of the battery pack and various circuits connected to the processor, and the program may be written onto a recording medium or distributed through communication lines and so on. The recording medium may be an IC card, a hard disk, an optical disc, a floppy disc, ROM, and so on. The control program that is delivered and distributed is used by being stored in processor-readable memory, and the various functions described in the above Embodiments are realised by the processor executing the control program.

(14) The above-described Embodiments and Variations may be freely combined.

<Supplement>

Aspects of the battery pack pertaining to the disclosure are described below, along with effects thereof.

(a) In one aspect, a battery pack (100) used by removably connecting to a plurality of external hardware types each having a different communication protocol, the battery pack includes: a secondary cell (106) a connector (110) removably connecting the battery pack to external hardware; a memory (103) storing a plurality of communication protocols; a power discharge circuit (107) performing discharge from the secondary cell to the external hardware; an establisher (104, 108) establishing communication by specifying a usable communication protocol, among the communication protocols, that communicates with the external hardware; and a controller (108) causing the power discharge circuit to discharge electric power for driving the external hardware when the establisher has established communication with the external hardware.

Accordingly, the battery pack stores various communication protocols and, when connected to hardware, specifies a communication protocol that is able to communicate with the connected hardware, establishes communication, and permits discharge. Thus, electric power is supplied to various types of connected hardware. Also, discharge is only permitted once communication is established. Thus, a highly safe battery pack is provided that does not discharge electricity when no hardware is connected or when unsupported hardware is connected to the battery pack.

Also, the device connected to the battery pack requires only that a new terminal be installed for connecting to the battery pack, and can thus make use of the battery pack without requiring much internal reconfiguration. Accordingly, a highly generalizable battery pack is provided.

(b) In another aspect, when the connector has connected to the external hardware, the establisher transmits a communication request signal to the external hardware requesting a response signal to one of the communication protocols, and specifies the usable communication protocol as one of the communication protocols to which the external hardware responds.

Accordingly, the communication request signal is transmitted for each communication protocol from the battery pack and the hardware responds by transmitting a response signal that is understandable. As such, a usable communication protocol is identified.

(c) Also, the establisher specifies the usable communication protocol by selecting and transmitting the communication request signal for the one of the communication protocols, and transmitting the communication request signal of another communication protocol when the response to the communication request signal is not received.

Accordingly, the battery pack switches among a plurality of communication protocols to sequentially transmit the communication request signal and thereby identify a communication protocol usable for communication.

(d) Additionally, the memory stores the communication protocols as a plurality of groups into which similar communication protocols sharing at least a level of compatibility are divided, and the establisher selects a particular communication protocol from each of the groups and specifies the usable communication protocol through sequential transmission, starting with the communication request signal for the particular communication protocol selected from each of the groups.

Accordingly, the communication protocols are divided into groups, one communication protocol is selected as a representative for the group, and the communication request signal for the representative communication protocol is transmitted first. Thus, the process of transmitting the communication request signal for many communication protocols is simplified, enabling quick establishment of communication.

(e) Further, the establisher determines usability according to whether or not a plurality of conditions are satisfied by the response signal to the communication request signal, and when one of the particular communication protocols satisfies only a subset of the conditions, the establisher specifies the usable communication protocol by prioritizing transmission of the communication request signal for a member communication protocol from the same one of the groups.

Accordingly, compatible communication protocols are divided into groups, and one representative communication protocol among each group is prioritised for communication request signal transmission. When a certain level of communication is reached without fully establishing communication using the representative communication protocol, the communication request signal for other communication protocols in the same group as the representative communication protocol is prioritised, thereby achieving quick establishment of communication.

(f) Further still, a history information memory storing communication history information for any of the communication protocols used for communication, when the battery pack has been connected to the external hardware by the connector and has performed communication, wherein the establisher specifies the usable communication protocol by applying the communication history information stored by the history information memory to prioritize transmission of a high usage frequency communication protocol.

Accordingly, the communication request signal of a communication protocol that is used frequently by the battery pack is transmitted first, enabling quick establishment of communication.

(g) In addition, a communication protocol memory storing a most recent communication protocol having been used to communicate with the external hardware connected via the connector, wherein when the connector connects to new external hardware, the establisher initially transmits the communication request signal of the most recent communication protocol stored in the communication protocol memory.

Accordingly, the communication request signal of a communication protocol most recently used by the battery pack is transmitted first, enabling quick establishment of communication. The hardware matching the most recently used communication protocol is highly likely to be reconnected. As such, this approach enables quick establishment of communication.

(h) In further addition, the establisher specifies the usable communication protocol by prioritizing transmission of the communication request signal for a high-speed communication protocol that establishes communication relatively quickly.

Accordingly, the communication request signal of a communication protocol with high communication speed is transmitted first, enabling quick establishment of communication.

(i) Alternatively, the controller does not allow discharge to new external hardware when the connector connects to the new external hardware and the establisher is unable to establish communication using any of the communication protocols.

Accordingly, the battery pack does not discharge electricity unless communication is established, thereby providing a safe battery pack.

(j) Yet further, the controller does not allow discharge to new external hardware when the connector connects to the new external hardware and a discharge forbidden signal is received that forbids discharge by the battery pack to the new external hardware.

Accordingly, the battery pack is able to prevent discharge when a discharge forbidden signal is received, which forbids discharge. The battery pack us able to prevent discharge of electric power when instructed by outside hardware, thereby enabling safe operation of the battery pack.

(k) Furthermore, a display displaying information indicating whether or not the controller allows discharge.

Accordingly, the user of the battery pack can check the indicators on the battery pack to easily acknowledge whether or not the battery pack is usable.

(l) Still additionally, a communication protocol acquirer acquiring the communication protocols from an external network, by communicating with the external network; and a storage instructor causing the memory to store the communication protocols acquired by the communication protocol acquirer.

Accordingly, the battery pack is able to acquire and store a new communication protocol through a network. Thus, the odds of being able to connect to and communicate with hardware with which communication was previously impossible are increased. Accordingly, a highly generalizable battery pack is provided.

(m) Still further, a communication protocol acquirer acquiring the communication protocols from the external hardware, by communicating with the external hardware; and a storage instructor causing the memory to store the communication protocols acquired by the communication protocol acquirer.

Accordingly, the battery pack is able to acquire and store a new communication protocol through external hardware. Thus, the odds of being able to connect to and communicate with hardware with which communication was previously impossible are increased. Accordingly, a highly generalizable battery pack is provided.

(n) Also, a power charge circuit receiving electric power and charging the secondary cell when the external hardware is able to supply the electric power, wherein when the establisher has established communication with the external hardware that is able to supply the electric power, the controller causes the power charge circuit to charge the secondary cell rather than causing the power discharge circuit to discharge.

The hardware supplying the electric power is, for example, a charger for the battery pack, an outlet in a power distribution grid, a storage cell other than battery pack, and so on.

Accordingly, the battery pack is able to perform not only discharge to the connected hardware but also charging of electric power.

(o) In another aspect, electric hardware provided with a first connection terminal to which a battery pack is removably connectable, the battery pack being used by removably connecting to a plurality of external hardware types each having a different communication protocol, the battery pack comprising: a secondary cell; a second connection terminal connecting to the first connection terminal; a memory storing a plurality of communication protocols; a power discharge circuit performing discharge from the secondary cell to external hardware; an establisher establishing communication when the second connection terminal is connected to the first connection terminal, by specifying a usable communication protocol, among the communication protocols, that communicates with the electric hardware; and a controller causing the power discharge circuit to discharge when the establisher has established communication with the electric hardware, wherein the electric hardware is driven by electric power discharged from the power discharge circuit, via the first connection terminal and the second connection terminal.

Accordingly, a highly-generalizable battery pack is provided that is removably mountable onto hardware.

(p) In addition, a discharge forbidden signal transmitter transmitting a discharge forbidden signal to the battery pack that is connected, forbidding discharge of the electric power from the battery back, wherein the controller does not allow discharge from the secondary cell when the discharge forbidden signal is received.

Accordingly, the electric hardware is able to forbid discharge by the battery pack. Thus, when the battery pack is connected to incompatible hardware, the hardware is prevented from being damaged by receiving electric power from the battery pack outside the tolerance of the hardware.

The battery pack of the present disclosure is widely applicable as a power source for various types of electric hardware.

REFERENCE SIGNS LIST

100 Battery pack
101 Switch
102 Display
103 Memory
104 Communicator
105 Power charge circuit
106 Storage cell
107 Discharge circuit
108 Controller
110 Terminals

The invention claimed is:

1. A battery pack used by removably connecting to a plurality of external hardware types each having a different communication protocol, the battery pack comprising:
a secondary cell;
a connector removably connecting the battery pack to external hardware;
a memory storing a plurality of communication protocols;
a power discharge circuit performing discharge from the secondary cell to the external hardware;
an establisher connected via a line to the connector and communicating with the external hardware via the line and the connector, and establishing communication by specifying a usable communication protocol, among the communication protocols, that communicates with the external hardware; and
a controller causing the power discharge circuit to discharge electric power for driving the external hardware when the establisher has established communication with the external hardware,
wherein the establisher transmits, via the line and the connector, a communication request signal to the external hardware requesting a response signal using one of the communication protocols, judges whether the response signal has been received from the external hardware via the line and the connector, and when judging that the response signal has been received, specifies the communication protocol used for transmitting the communication request signal as the usable communication protocol, and when judging that the response signal has not been received, sequentially transmitting, via the line and the connector, the communication request signal using different communication protocols until it is judged that the response signal has been received and specifying a communication protocol used for transmitting the communication request signal for the received response signal as the usable communication protocol.

2. The battery pack of claim 1, wherein
the establisher establishes communication via the connector.

3. The battery pack of claim 1, wherein
the establisher specifies the usable communication protocol by selecting and transmitting the communication request signal for the one of the communication protocols, and transmitting the communication request signal of another communication protocol when the response to the communication request signal is not received.

4. The battery pack of claim 3, wherein
the memory stores the communication protocols as a plurality of groups into which similar communication protocols sharing at least a level of compatibility are divided, and
the establisher selects a particular communication protocol from each of the groups and specifies the usable communication protocol through sequential transmission, starting with the communication request signal for the particular communication protocol selected from each of the groups.

5. The battery pack of claim 4, wherein
the establisher determines usability according to whether or not a plurality of conditions are satisfied by the response signal to the communication request signal, and
when one of the particular communication protocols satisfies only a subset of the conditions, the establisher specifies the usable communication protocol by prioritizing transmission of the communication request signal for a member communication protocol from the same one of the groups.

6. The battery pack of claim 3, further comprising
a history information memory storing communication history information for any of the communication protocols used for communication, when the battery pack has been connected to the external hardware by the connector and has performed communication, wherein
the establisher specifies the usable communication protocol by applying the communication history information stored by the history information memory to prioritize transmission of a high usage frequency communication protocol.

7. The battery pack of claim 3, further comprising
a communication protocol memory storing a most recent communication protocol having been used to communicate with the external hardware connected via the connector, wherein
when the connector connects to new external hardware, the establisher initially transmits the communication request signal of the most recent communication protocol stored in the communication protocol memory.

8. The battery pack of claim 3, wherein
the establisher specifies the usable communication protocol by prioritizing transmission of the communication request signal for a high-speed communication protocol that establishes communication.

9. The battery pack of claim 1, wherein
the controller does not allow discharge to new external hardware when the connector connects to the new external hardware and the establisher is unable to establish communication using any of the communication protocols.

10. The battery pack of claim 1, wherein
the controller does not allow discharge to new external hardware when the connector connects to the new external hardware and a discharge forbidden signal is received that forbids discharge by the battery pack to the new external hardware.

11. The battery pack of claim 9, further comprising
a display displaying information indicating whether or not the controller allows discharge.

12. The battery pack of claim 1, further comprising:
a communication protocol acquirer acquiring the communication protocols from an external network, by communicating with the external network; and
a storage instructor causing the memory to store the communication protocols acquired by the communication protocol acquirer.

13. The battery pack of claim 1, further comprising:
a communication protocol acquirer acquiring the communication protocols from the external hardware, by communicating with the external hardware; and
a storage instructor causing the memory to store the communication protocols acquired by the communication protocol acquirer.

14. The battery pack of claim 1, further comprising
a power charge circuit receiving electric power and charging the secondary cell when the external hardware is able to supply the electric power, wherein
when the establisher has established communication with the external hardware that is able to supply the electric power, the controller causes the power charge circuit to charge the secondary cell rather than causing the power discharge circuit to discharge.

15. The battery pack of claim 1, wherein
the establisher judges whether the response signal has been received within a predetermined period of time, and specifies the communication protocol only when judging that the response signal has been received within the predetermined period of time.

16. The battery pack of claim 1, wherein
the establisher, when judging that the response signal has not been received, transmits a communication request signal for another communication protocol.

17. An electric hardware provided with a first connection terminal to which a battery pack is removably connectable, the battery pack being used by removably connecting to a plurality of external hardware types each having a different communication protocol, the battery pack comprising:
a secondary cell;
a second connection terminal connecting to the first connection terminal;
a memory storing a plurality of communication protocols;
a power discharge circuit performing discharge from the secondary cell to external hardware;

an establisher connected via a line to the first connection terminal and the second connection terminal and communicating with the external hardware via the line, the first connection terminal and the second connection terminal, and establishing communication by specifying a usable communication protocol, among the communication protocols, that communicates with the electric hardware; and a controller causing the power discharge circuit to discharge, wherein when the establisher establishes communication with the battery pack, the electric hardware is driven by electric power discharged from the power discharge circuit, via the first connection terminal and the second connection terminal, the establisher transmits, via the line, the first connection terminal and the second connection terminal, a communication request signal to the external hardware requesting a response signal using one of the communication protocols, judges whether the response signal has been received from the external hardware, via the line, the first connection terminal and the second connection terminal, and when judging that the response signal has been received, specifies the communication protocol used for transmitting the communication request signal as the usable communication protocol, and when judging that the response signal has not been received, sequentially transmitting, via the line, the first connection terminal and the second connection terminal, the communication request signal using different communication protocols until it is judged that the response signal has been received and specifying a communication protocol used for transmitting the communication request signal for the received response signal as the usable communication protocol.

18. The electric hardware of claim 17, further comprising a discharge forbidden signal transmitter transmitting a discharge forbidden signal to the battery pack that is connected, forbidding discharge of the electric power from the battery back, wherein the controller does not allow discharge from the secondary cell when the discharge forbidden signal is received.

19. A communication control method for a battery pack to communicate with a destination, the battery pack including a secondary cell and a power discharge circuit discharging electric power from the secondary cell and being removably connectable to a plurality of hardware types each having a different communication protocol, the destination being external hardware, the communication control method comprising:

detecting a connection to the external hardware;

specifying, when the connection to the external hardware is detected, a usable communication protocol that communicates with the external hardware, from among a plurality of communication protocols;

establishing, using a line and a connector, communication with the external hardware using the given communication protocol when the usable communication protocol has been specified; and permitting discharge of electric power driving the external hardware by the power discharge circuit when communication has been established, wherein the establishing of the communication with the external hardware includes transmitting, via the line and the connector, a communication request signal to the external hardware requesting a response signal using one of the communication protocols, judging whether the response signal has been received from the external hardware, via the line and the connector, and when judging that the response signal has been received, specifying the communication protocol used for transmitting the communication request signal as the usable communication protocol, and when judging that the response signal has not been received, sequentially transmitting, via the line and the connector, the communication request signal using different communication protocols until it is judged that the response signal has been received and specifying a communication protocol used for transmitting the communication request signal for the received response signal as the usable communication protocol.

* * * * *

UNITED STATES PATENT AND TRADEMARK OFFICE
CERTIFICATE OF CORRECTION

| | | |
|---|---|---|
| PATENT NO. | : 9,660,464 B2 | Page 1 of 1 |
| APPLICATION NO. | : 14/360953 | |
| DATED | : May 23, 2017 | |
| INVENTOR(S) | : Shoichi Toya et al. | |

It is certified that error appears in the above-identified patent and that said Letters Patent is hereby corrected as shown below:

On the Title Page

Please add a citation to item (56) References Cited, under the heading OTHER PUBLICATIONS, at Line 16 as follows:
--Office Action issued March 9, 2017 in corresponding Chinese Application No. 201480000282.3, with English Translation of Search Report--.

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*